(12) United States Patent
Capece et al.

(10) Patent No.: US 8,964,532 B2
(45) Date of Patent: Feb. 24, 2015

(54) WIRELESS COMMUNICATION DEVICE INCLUDING A STANDBY RADIO

(75) Inventors: Christopher J. Capece, Lebanon, NJ (US); Gregg Nardozza, Glenwood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1378 days.

(21) Appl. No.: 11/771,213

(22) Filed: Jun. 29, 2007

(65) Prior Publication Data
US 2009/0003196 A1    Jan. 1, 2009

(51) Int. Cl.
*H04J 1/16*     (2006.01)
*H04B 1/04*     (2006.01)

(52) U.S. Cl.
CPC .................................... *H04B 1/0483* (2013.01)
USPC ......... 370/220; 370/219; 455/311; 455/243.1

(58) Field of Classification Search
None
See application file for complete search history.

(56) References Cited

U.S. PATENT DOCUMENTS

| | | | | |
|---|---|---|---|---|
| 4,748,423 | A | * | 5/1988 | Jinich ............................ 330/295 |
| 6,097,266 | A | * | 8/2000 | Nardozza et al. .............. 333/101 |
| 7,514,995 | B2 | * | 4/2009 | Yuan ......................... 330/124 R |

FOREIGN PATENT DOCUMENTS

EP    1796280 A1    6/2007

OTHER PUBLICATIONS

International Preliminary Report on Patentability for International application No. PCT/US2008/007838 mailed Jan. 14, 2010.
International Search Report and Written Opinion of the International Searching Authority for International application No. PCT/US2008/007838 mailed Sep. 12, 2008.

* cited by examiner

*Primary Examiner* — Huy D Vu
*Assistant Examiner* — Zewdu A Beyen
(74) *Attorney, Agent, or Firm* — Carlson, Gaskey & Olds

(57) ABSTRACT

A wireless communication device includes more than one radio. A lossless switching module allows for selectively using one of the radios in a standby mode. The switching module allows for switching in the standby radio in the event that another radio fails without introducing any loss. In disclosed examples, switching module inputs coupled with inactive or failed radio output ports are coupled to an impedance corresponding to the associated radio. Disclosed examples are also useful for combining the outputs of more than one radio under selected circumstances.

9 Claims, 4 Drawing Sheets

WIRELESS COMMUNICATION DEVICE INCLUDING A STANDBY RADIO

1. FIELD OF THE INVENTION

This invention generally relates to communication. More particularly, this invention relates to wireless communications.

2. DESCRIPTION OF THE RELATED ART

Wireless communication systems typically rely upon a radio as part of a base station transceiver assembly. The radio is responsible for providing wireless communication signals on an over-the-air interface so that the signals are available to mobile stations of subscribers, for example. Maintaining reliable radio operation is important to maintaining a consistent quality of service level for mobile subscribers.

The improvements and advances made in wireless communications include providing wider bandwidth communication channels. Supporting these may include using wider bandwidth radios. When wider bandwidth radios are employed, a larger number of simultaneously active voice and data calls are possible on a particular set of communication channels, for example. This is generally seen as an advantage because providers are able to facilitate a wider variety of communication types and to service more subscribers.

One disadvantage associated with wider bandwidth radios is that the failure of such a radio has a greater impact on the level of service available. A larger number of users may lose service if a wider bandwidth radio fails, for example. Accordingly, it has become apparent that there is an increased need to have standby radios available in the event that a radio should fail. One challenge is how to switch in a standby radio in place of a failed radio to minimize any time lapse in call service.

SUMMARY

An exemplary wireless communication device includes a first radio configured to provide a first radio frequency output on a plurality of carriers. A second radio is configured to provide a second radio frequency output on a plurality of carriers. A lossless switching module includes a first input coupled with the first radio, a second input coupled with the second radio and a switched output. A controller selectively controls the switching module to provide the first radio frequency output on the switched output and couple the second input to an impedance corresponding to an impedance of the second radio if the second radio is in a standby mode. The controller controls the switching module to provide the second radio frequency output on the switched output and couple the first input to an impedance corresponding to an impedance of the first radio if the second radio is operating in place of the first radio.

In another example, the controller selectively controls the switching module to provide the first and second radio frequency outputs combined on the switched output if the carriers of the first radio frequency output are different than the carriers of the second radio frequency output, such as when the two radios share the bandwidth of carriers.

The various features and advantages of the disclosed examples will become apparent from the following detailed description. The drawings that accompany the detailed description can be briefly described as follows.

DETAILED DESCRIPTION

Figure 1:
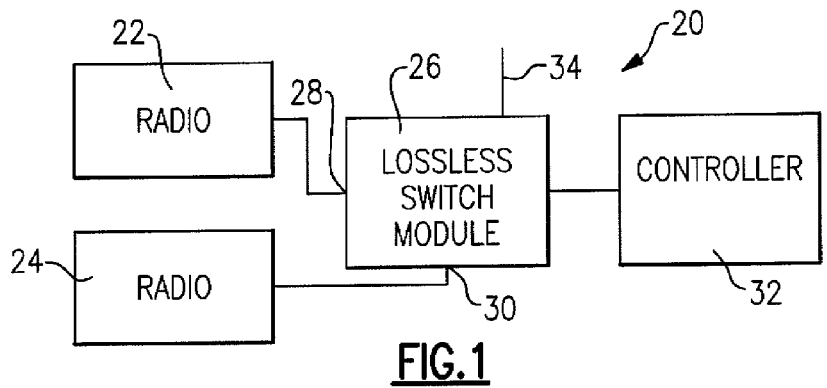
FIG. 1 schematically illustrates a wireless communication device designed according to an embodiment of this invention.

FIG. 1 schematically shows a wireless communication device 20 that includes a first radio 22 and a second radio 24. A lossless switching module 26 has a first input 28 coupled with the first radio 22 and a second input 30 coupled with the second radio 24. A controller 32 controls operation of the switching module 30 to achieve a desired output based on the output of one or more of the radios. The lossless switching module 26 includes a switched output 34 for providing the output from one or both of the radios, depending on the needs of a particular situation. The example wireless communication device 20 may be part of a base station transceiver configuration, for example. The controller 32 may be part of a base station controller or a dedicated controller configured to control the operation of the switching module 26 to achieve the desired radio output.

Figure 2:
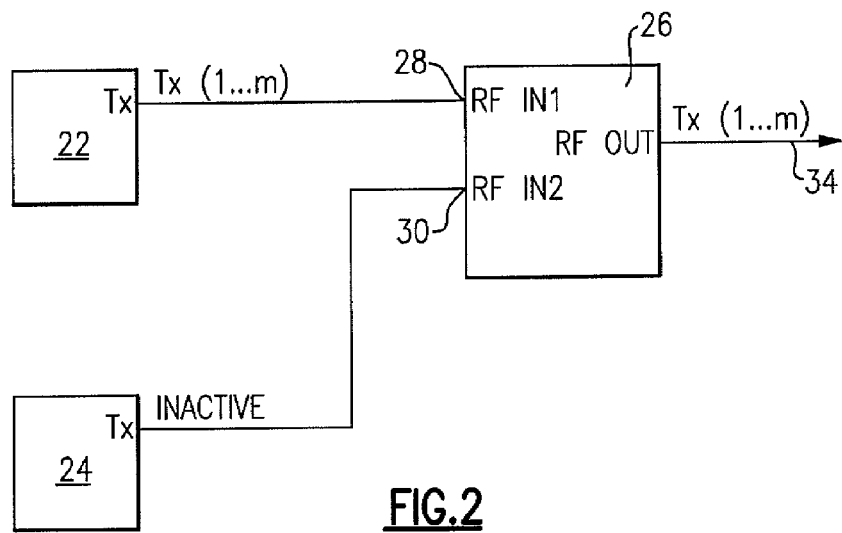
FIG. 2 schematically illustrates the example wireless communication device in one example operating condition.

In some examples, one of the radios 22, 24 will serve as a standby or backup radio for the other. One such scenario is schematically shown in FIG. 2. In this example, the first radio 22 provides a first radio frequency output that includes a plurality of carriers. In this example, the plurality of carriers range from a carrier 1 through a carrier M. While the first radio 22 is operating properly, the second radio 24 serves as a standby radio in case of a problem with the first radio 22. The controller 32 controls the switching module 26 to provide the first radio frequency output (e.g., the carriers 1 through M) on a switched output 34. The first input 28 is coupled with the output of the first radio 22 and with the switched output 34. The second input 30 of the switching module 26 is coupled with the output of the second radio 24 and with an impedance that corresponds to an impedance of the second radio 24. In one example, that impedance is approximately 50 Ohms. Controlling the switching module 26 to achieve that arrangement allows for the switching module 26 to provide the first radio frequency output from the first radio 22 over the switched output 34 without introducing any loss.

Figure 3:
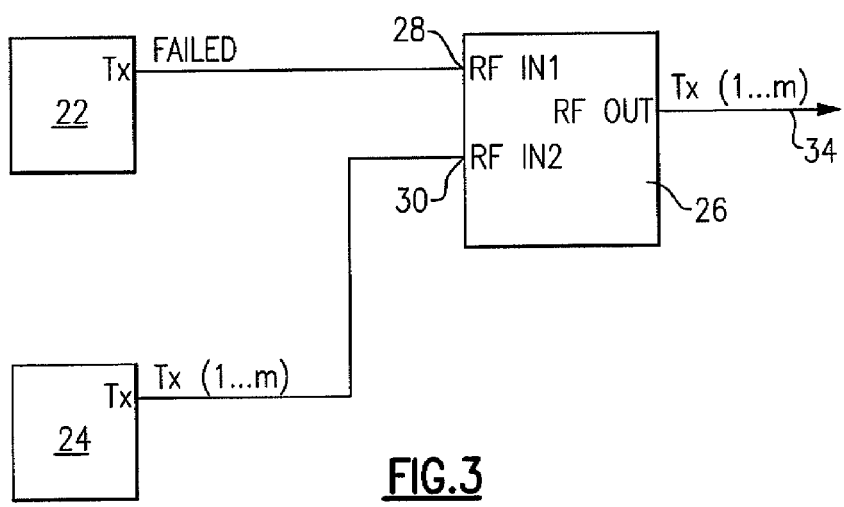
FIG. 3 schematically illustrates the example wireless communication device in another example operating condition.

The switching module 26 is capable of switching between the first radio 22 and the second radio 24 without introducing any loss. FIG. 3 schematically shows another operating condition where the first radio 22 has failed. The controller 32 controls the switching module 26 under such circumstances to switch over to the second radio frequency output provided by the second radio 24. In the example of FIG. 3, the second radio frequency output includes the carriers 1 through M. Under these conditions, the switching module 26 is configured such that the second input 30 is coupled with the switched output 34 to provide the second radio frequency output on the switched output 34. The first input 28 is coupled to an impedance that corresponds to an impedance of the first radio 22. In one example, that impedance is approximately 50 Ohms.

Assuming that the first radio 22 again becomes available for operation, the controller 32 may selectively switch between the radios 24 and 22 to keep one of them in a standby mode of operation while using the other for providing the output on the carriers 1 through M over the switched output 34.

Figure 4:
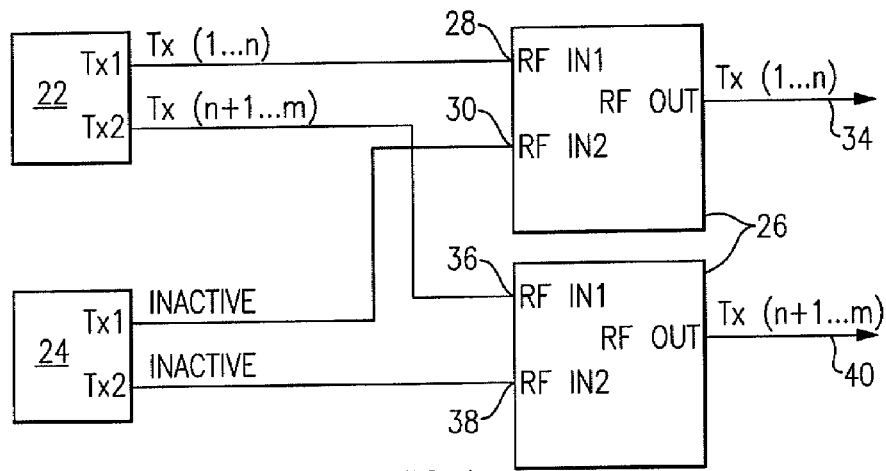
FIG. 4 schematically illustrates the example wireless communication device in another example operating condition.

The examples of FIGS. 2 and 3 include single output radios. An example schematically shown in FIG. 4 includes dual output radios. In this example, the first radio 22 has a first output port that is coupled with the first input 28 of the switching module 26. The second radio 24 has a second output port that is coupled with the second input 30 of the switching module 26. The first radio 22 includes a third output port that is coupled with a third input 36 to the switching module 26. The second radio 24 includes a fourth output port coupled with a fourth input 38 to the switching module 26.

In this example, the switching module 26 includes a first switched output 34 associated with the inputs 28 and 30 and a second switched output 40 associated with the inputs 36 and 38. The situation illustrated in FIG. 4 includes dividing up the bandwidth of carriers 1 through M into two sets such that the first radio frequency includes carriers 1 through N as the output from the first output port of the first radio 22. The carriers N+1 through M are in the first radio frequency output on the third output port, which is coupled with the third input 36 to the switching module 26. The carriers 1 through N are provided on the output of the switched output 34 while the carriers N+1 through M are provided on the second switched output 40.

When the first radio 22 is operating as desired, the second radio 24 remains inactive in a standby mode. In this situation, the second input 30 is coupled with an impedance corresponding to an impedance of the second output port of the second radio 24. The fourth input 38 is coupled with an impedance corresponding to the impedance of the fourth output port of the second radio 24.

Figure 5:
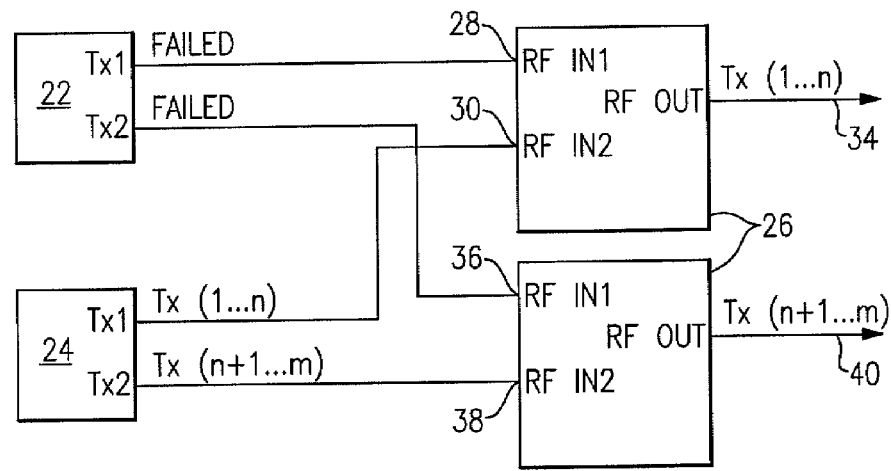
FIG. 5 schematically illustrates the example wireless communication device in another example operating condition.

FIG. 5 schematically illustrates a situation where the first radio 22 has failed and the second radio 24 has been switched in to operate in place of the first radio 22. In this example, the carriers 1 through N are part of the second radio frequency output coupled with the input 30 so that the carriers 1 through N are still provided on the switched output 34. The carriers N+1 through M are part of the second radio frequency output from the fourth output port that is provided to the fourth input 38. The carriers N+1 through M are part of the radio frequency output on the second switched output 40. The first input 28 and the third input 36 are each coupled to an impedance corresponding to an impedance of the associated output port of the first radio 22. The controller 32 controls the switches of the switching module 26 to effect this change without introducing any loss.

In one example, the controller 32 is programmed and configured to ensure that any information such as buffered data, for example, that would have been handled by the first radio 22 is transferred to the second radio 24 in the event of switching from the first radio 22 to the second radio 24. This level of control may be implemented at a base station controller level, for example. If the controller 32 is responsible for monitoring the operation state of the radios, the controller 32 may be responsible for ensuring that all transmissions that would have occurred through the radio 22 are transferred over to the radio 24 so that no transmissions are lost. If the controller 32 is not responsible for monitoring the operations of the radios and only responds to a separate controller (e.g., a separate base station controller or a radio network controller), then the controller 32 may be dedicated to only controlling the switching module to achieve the desired outputs and the other controller will be responsible for transferring or routing information previously contained in or intended for a failed radio to the standby radio that is taking over the corresponding communication responsibility.

Figure 6:
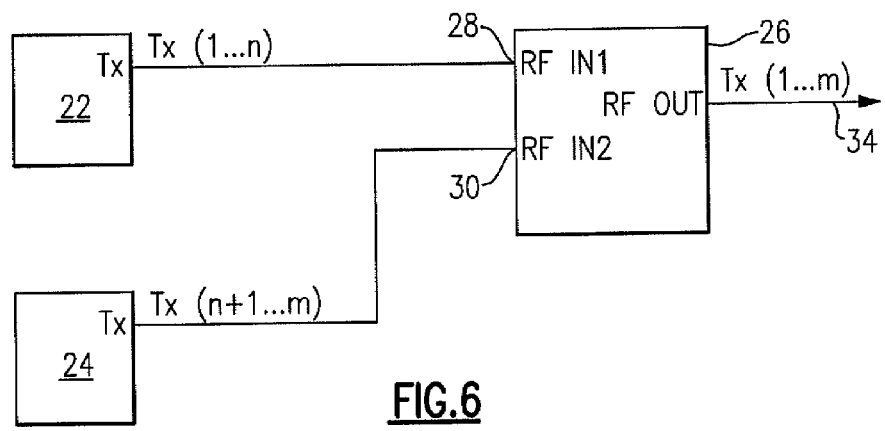
FIG. 6 schematically illustrates the example wireless communication device in another example operating condition.

The switching module 26 can also be used for combining the output of more than one radio. FIG. 6 schematically illustrates a situation where the first radio 22 is responsible for handling the carriers 1 through N and the second radio 24 is assigned the carriers N+1 through M. In this example, the switched output 34 provides a radio frequency output that combines the outputs of the two radios so that the carriers 1 through M are on the switched output 34. In one example, such a combination of radio outputs over the switched output 34 results in a 3 dB loss on each carrier.

Figure 7:
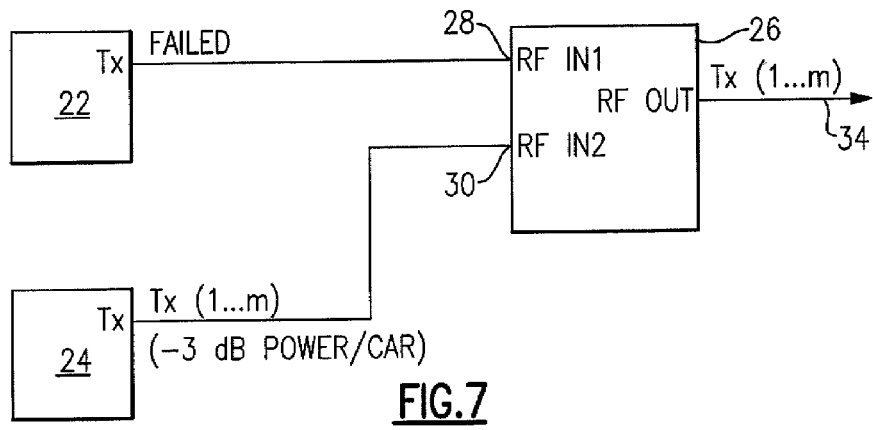
FIG. 7 schematically illustrates the example wireless communication device in another example operating condition.

FIG. 7 schematically illustrates a situation where the first radio 22 has failed. The entire plurality of carriers 1 through M are now assigned to the second radio 24, which is effectively acting as a standby radio for the carriers 1 through N. The controller 32 controls the switching module 26 to couple the second input 30 with the switched output 34 so that all the carriers 1 through M are still available on the switched output 34. The first input 28 is coupled to an impedance corresponding to an impedance of the radio 22.

Under the operating conditions shown in FIG. 7, a 3 dB loss is introduced onto each carrier so that the output on the switched output 34 when only the second radio 24 is operating is the same as when both radios 22 and 24 were operating. When the two radio outputs are combined by the switching module 26, that results in a 3 dB loss per carrier. When one of the radios fails and the other operates exclusively, introducing a 3 dB loss per carrier maintains consistency on the switched output 34.

Figure 8:
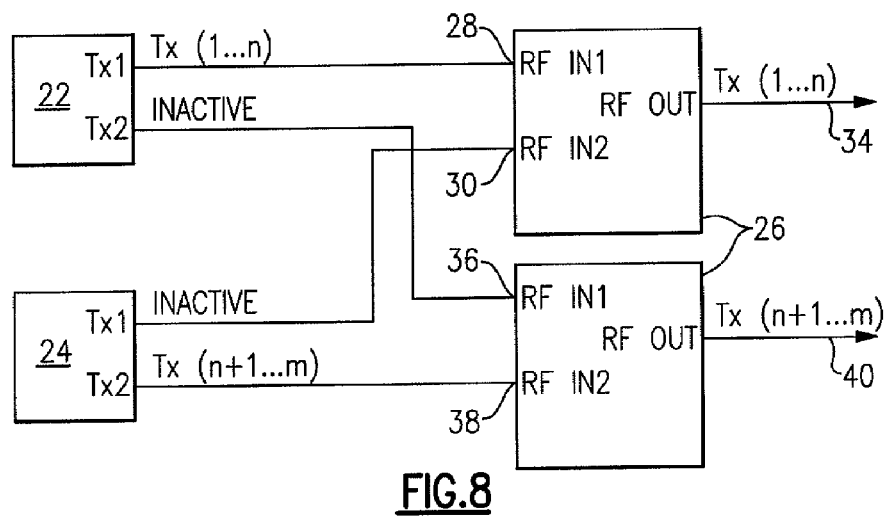
FIG. 8 schematically illustrates the example wireless communication device in another example operating condition.

FIG. 8 schematically shows another example arrangement where the first radio 22 and the second radio 24 each comprise a dual output radio. In this example, the carriers 1 through N are part of the first radio frequency output from the first output port of the first radio 22. The carriers 1 through N are provided on the output of the switched output 34. The carriers N+1 through M are part of the second radio frequency output of the second radio 24. Those carriers in this example are provided on the fourth output port coupled with the fourth input 38 such that the carriers N+1 through M are part of the output from the second switched output 40. In this example, the two radios 22 and 24 share the total carrier capacity under normal operating conditions.

Figure 9:
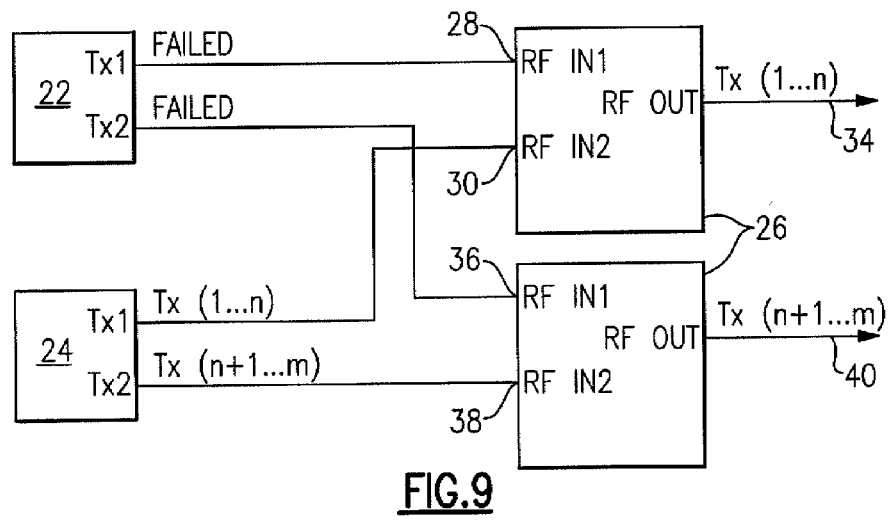
FIG. 9 schematically illustrates the example wireless communication device in another example operating condition.

It is possible for one of the radios 22 or 24 to fail. Such a scenario is shown in FIG. 9 where the first radio 22 has failed. The second output port of the second radio 24 in this example is used for the carriers 1 through N because the first radio 22 has failed. The second output port is coupled with the second input 30 of the switching module 26 such that the carriers 1 through N are provided on the switched output 34. The carriers N+1 through M continue to be provided on the second switched output 40. In this example, the first input 28 and the third input 36 are coupled with an impedance corresponding to the associated output ports of the first radio 22.

Figure 10:
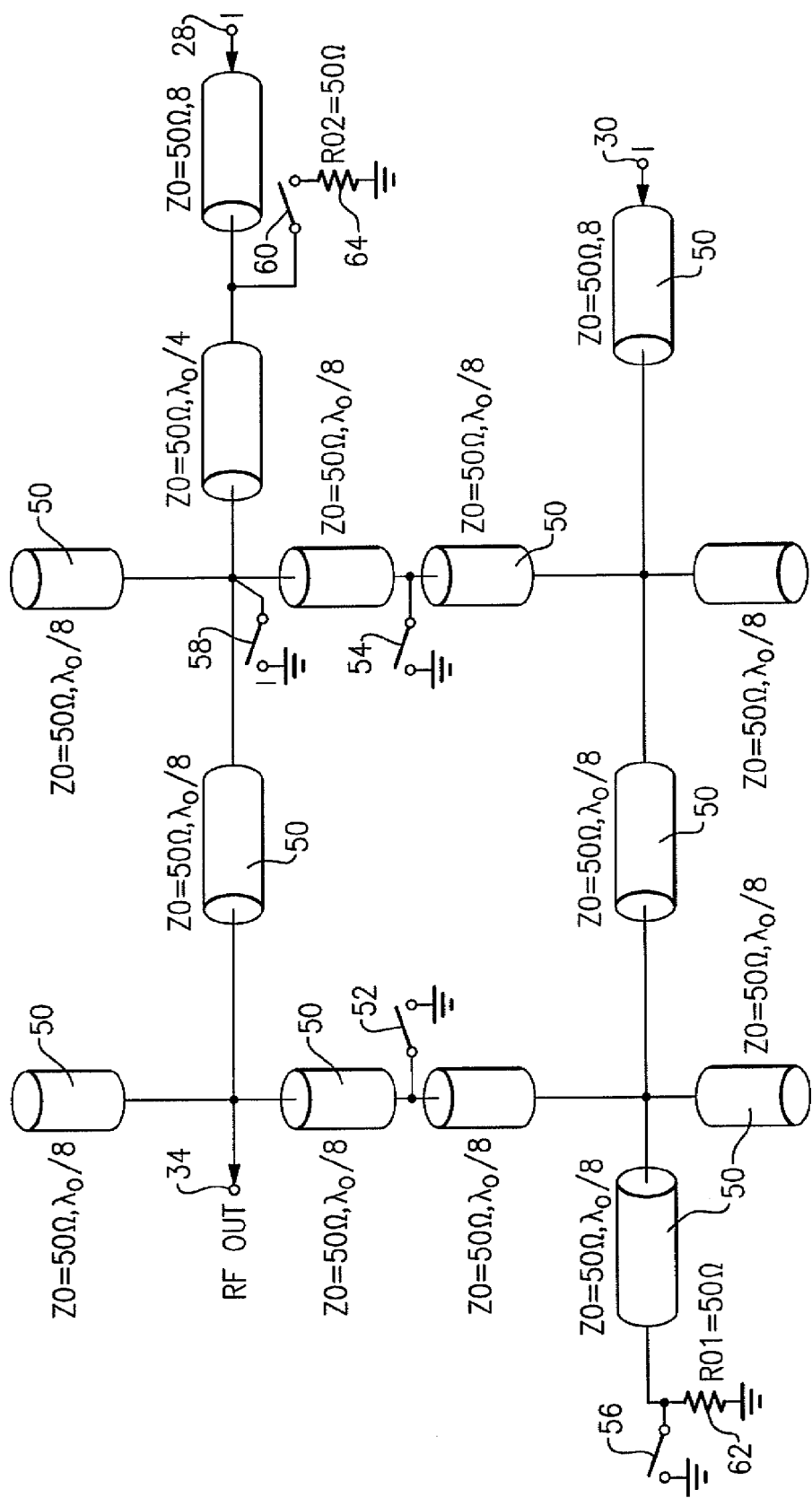
FIG. 10 schematically illustrates an example lossless switching module configuration.

The switching module 26 may take a variety of forms provided that it facilitates a lossless switch between the radios under circumstances such as those described above. One example switching module arrangement is shown in FIG. 10. In this example, the switching module 26 comprises a plurality of transmission line segments 50, a plurality of switches 52-60 and impedances 62 and 64. This example includes 50 Ohm impedances 62 and 64.

In this example, if all switches 52-60 remain open, the switching module 26 combines what is received at the inputs 28 and 30 and provides a combined output on the switched output 34.

When the second radio 24, coupled to the second input 30, is in a standby mode, the controller 32 controls the switching module 26 such that the switches 52 and 54 are closed. The switches 56, 58 and 60 remain open. In this condition, the first radio frequency output received at the input 28 is coupled to the switched output 34 through a 50 Ohm line. The second input 30, which is coupled to the output of the second radio 24, is coupled with the impedance 62 through a 50 Ohm transmission line.

If it becomes necessary to switch from the first radio 22 to the second radio 24, the controller 32 controls the switching module 26 by opening the switch 52 and closing the switches 54-60. In this condition, the second radio frequency output received at the second input 30 is coupled to the switched output 34 through a 50 Ohm line. At the same time, the input 28, which is coupled with the output of the first radio 22, is coupled with the impedance 64 through a 50 Ohm line.

The example switching module 26 allows for coupling one of the radios 22, 24 with the switched output 34 without loss so that the switching module 26 can be regarded a lossless switching module.

The example of FIG. 10 is consistent with one of the embodiments of U.S. Pat. No. 6,097,266. Other embodiments from that document could be used as the lossless switching module 26 in an implementation of this invention. The teachings of U.S. Pat. No. 6,097,266 are incorporated into this description by reference.

FIG. 10 shows the components of one example consistent with the switching module of FIGS. 2, 3, 6 and 7. In cases like the examples of FIGS. 4, 5, 8 and 9, the switching module 26 will include two sets of the components schematically shown in FIG. 10 to provide the third and fourth inputs 36 and 38 and the second switched output 40.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A wireless communication device, comprising
a first radio configured to provide a first radio frequency output on a plurality of carriers;
a second radio configured to provide a second radio frequency output on a plurality of carriers;
a lossless switching module including
a first input coupled with the first radio;
a second input coupled with the second radio; and
a switched output;
and
a controller that selectively controls the switching module to
(i) provide the first radio frequency output on the switched output and couple the second input to an impedance corresponding to an impedance of the second radio if the second radio is in a standby mode and
(ii) provide the second radio frequency output on the switched output and couple the first input to an impedance corresponding to an impedance of the first radio if the second radio is operating in place of the first radio, wherein the controller selectively controls the switches to provide the first and second radio frequency outputs combined on the switched output if the carriers of the first radio frequency output are different than the carriers of the second radio frequency output.

2. A wireless communication device, comprising
a first radio configured to provide a first radio frequency output on a plurality of carriers;
a second radio configured to provide a second radio frequency output on a plurality of carriers;
a lossless switching module including
a first input coupled with the first radio;
a second input coupled with the second radio;
a switched output;
and
a controller that selectively controls the switching module to provide the first and second radio frequency outputs combined on the switched output if the carriers of the first radio frequency output are different than the carriers of the second radio frequency output.

3. The device of claim 2, wherein the controller selectively controls the switching module to
(i) provide the first radio frequency output on the switched output and couple the second input to an impedance corresponding to an impedance of the second radio if the first radio is operating in place of the second radio and
(ii) provide the second radio frequency output on the switched output and couple the first input to an impedance corresponding to an impedance of the first radio if the second radio is operating in place of the first radio.

4. The device of claim 3, wherein the controller causes the output of each carrier to be reduced by an amount corresponding to a combination loss per carrier associated with the first and second radio frequency outputs being combined on the switched output if the first radio operates in place of the second radio or the second radio operates in place of the first radio.

5. The device of claim 3, wherein the controller determines when the first or the second radio has failed to operate as desired and responsively switches between providing the combined first and second radio frequency outputs or an appropriate one of the radio frequency outputs on the switched output.

6. The device of claim 2, wherein
the first radio comprises a first output port coupled with the first input and a third output port configured to provide the first radio frequency output;
the second radio comprises a second output port coupled with the second input and a fourth output port configured to provide the second radio frequency output; and
the lossless switching module comprises
a third input coupled with the third output port,
a fourth input coupled with the fourth output port,
the switched output selectively coupled with the first and second inputs, and
a second switched output selectively coupled with the third and fourth inputs.

7. The device of claim 6, wherein the controller selectively controls the switching module to
(i) provide the first radio frequency output on the switched output and the second radio frequency output on the second switched output if the plurality of carriers of the first radio frequency output is different than the carriers of the second radio frequency output and
(ii) couple the second and third inputs with an impedance corresponding to the associated radio.

8. The device of claim 7, wherein the controller selectively controls the switching module to
  (i) provide the second radio frequency output on each of the switched output and the second switched output if the second radio is operating in place of the first radio wherein the plurality of carriers of the second radio frequency output from the second output port correspond to the plurality of carriers of the first radio frequency output and
  (ii) couple the first and third inputs with an impedance corresponding to the first radio.

9. The device of claim 7, wherein the controller selectively controls the switching module to
  (i) provide the first radio frequency output on each of the switched output and the second switched output if the first radio is operating in place of the second radio wherein the plurality of carriers of the first radio frequency output from the third output port correspond to the plurality of carriers of the second radio frequency output and
  (ii) couple the second and fourth inputs with an impedance corresponding to the second radio.

* * * * *